United States Patent [19]
Schmoyer

[11] 3,724,097
[45] Apr. 3, 1973

[54] PROGRAMMED AUDIO-VISUAL PRESENTATION OF INFORMATION FOR INSTRUCTION IN THE OPERATION OF KEYBOARD CONTROLLED INSTRUMENTS

[76] Inventor: Arthur R. Schmoyer, 11708 River Road, Potomac, Md. 20854

[22] Filed: June 10, 1971

[21] Appl. No.: 151,729

[52] U.S. Cl. ........................................35/6, 84/478
[51] Int. Cl. ..............................................G09b 15/04
[58] Field of Search...........35/5, 6, 9 R; 84/470, 477, 84/478, 485

[56] References Cited

UNITED STATES PATENTS

| | | | |
|---|---|---|---|
| 3,377,716 | 4/1968 | Schmoyer | 35/6 UX |
| 3,610,086 | 10/1971 | Decker | 84/470 |
| 3,353,435 | 11/1967 | Schmoyer | 84/478 |
| 3,482,480 | 12/1969 | Decker | 84/470 X |
| 3,577,824 | 5/1971 | Lavan | 84/470 |
| 3,153,365 | 10/1964 | Redmont | 84/478 |
| 3,403,591 | 10/1968 | Weitzner | 84/485 |
| 2,917,834 | 12/1959 | Butler et al. | 35/8 |
| 2,570,908 | 10/1951 | Behr | 35/5 |
| 2,628,030 | 2/1953 | Taylor | 35/5 |
| 3,619,886 | 11/1971 | Saave et al. | 29/203 |

Primary Examiner—Robert W. Michell
Assistant Examiner—J. H. Wolff
Attorney—Smith, Michael, Bradford & Gardiner

[57] ABSTRACT

A system for instruction in the operation of a keyboard controlled instrument includes means for playback of synchronized prerecorded instructional programs including audio instructions and pictorial representations of the proper position of an operator's fingers when carrying out the audio instructions. In alternative embodiments, the pictorial representation is presented either proximate to the respective keys or is projected directly upon the key surface, but in either instance the position of the pictorially represented keys corresponds to that of the actual keys of the keyboard. The effect of the pictorial representation may be reinforced by additional indicators in the form of lights associated with the individual keys and projected thereon.

12 Claims, 7 Drawing Figures

INVENTOR
Arthur R. Schmoyer

INVENTOR Arthur R. Schmoyer

INVENTOR
Arthur R. Schmoyer

ATTORNEYS

PROGRAMMED AUDIO-VISUAL PRESENTATION OF INFORMATION FOR INSTRUCTION IN THE OPERATION OF KEYBOARD CONTROLLED INSTRUMENTS

ENVIRONMENT OF INVENTION

This invention relates to the field of audio-visual teaching methods and apparatus, and particularly to a device for teaching the operation of a keyboard controlled instrument, such as a typewriter, keypunch machine, calculator, piano, or organ, wherein the apparatus is activated by a pre-recorded magnetic tape bearing a program including both audio instructions and means for synchronizing visual instructions therewith.

BACKGROUND OF INVENTION - PRIOR ART

Apparatus of the aforementioned type has been suggested wherein a program of audio instructions and coded electrical impulse producing signals are used to control reproducing mechanism to present synchronized audible and visual stimuli to the student. One such apparatus is disclosed in my U.S. Pat. No. 3,377,716, issued Apr. 16, 1968, and another is the subject of application Ser. No. 80,354, filed Oct. 13, 1970 (now U.S. Pat. No. 3,664,036) by John E. E. Boswell, Jr., and Jesse H. Miner.

The visual portion of the instructional program in each of the aforementioned disclosures is presented in the form of lights or other indicators which may be proximate to or built into the actual keys of the keyboard, but which bear no resemblance to the keys or the student's hand when properly positioned thereon. The use of pictorial representations such as motion pictures or film strips to depict a proper form for accomplishing physical acts has long been recognized, and a film strip projector in combination with a keyboard teaching device is disclosed in Priednieks et al. U.S. Pat. No. 3,100,351, issued Aug. 13, 1963.

OBJECTS OF INVENTION

The apparatus of the aforedescribed prior art suffers from either of two deficiencies. First, the visual information is presented as indications indicative only of the position of the key to be depressed and is not helpful to the student in determining the position of his hand and fingers, or if indicative of the identity of the finger in which action is solicited, such indication is provided by number, color, etc., and must be "translated" in the student's mind, thus complicating and slowing the thought process. Secondly, where pictorial representations have been presented, they are so remote from the keyboard on which the student's response is solicited that the student must mentally transport the information from the display to the blank keyboard. Moreover, the lack of physical correspondence between the pictorial represented keys and the keyboard itself requires that the student orient his mental picture of the hand position along the keyboard in order to associate the fingers with the appropriate individual keys.

In contradistinction to the above, it is among the objects of this invention to provide a method and apparatus for programmed audio-visual presentation of instructional information in the operation of keyboard controlled instruments in which:

1. a student receives audible instructions and synchronized visual representations of an operator's hand in the position which he is being instructed to assume,
2. the pictorial representation is presented closely adjacent to or directly on the surface of the keys,
3. the position of the keys in the pictorial representation correspond to that of the keys of the keyboard itself,
4. the student may determine the accuracy of his performance in all aspects of form by directly comparing the position and form of his hand with that of the pictorial representation, and
5. the effect of the pictorial representation is reinforced by additional visual stimuli in the form of light indicators.

DESCRIPTION OF DRAWINGS

These and other self-evident advantages of this invention will be better understood by a consideration of the ensuing specification and accompanying drawings, in which.

DESCRIPTION OF APPARATUS OF INVENTION

Figure 1:
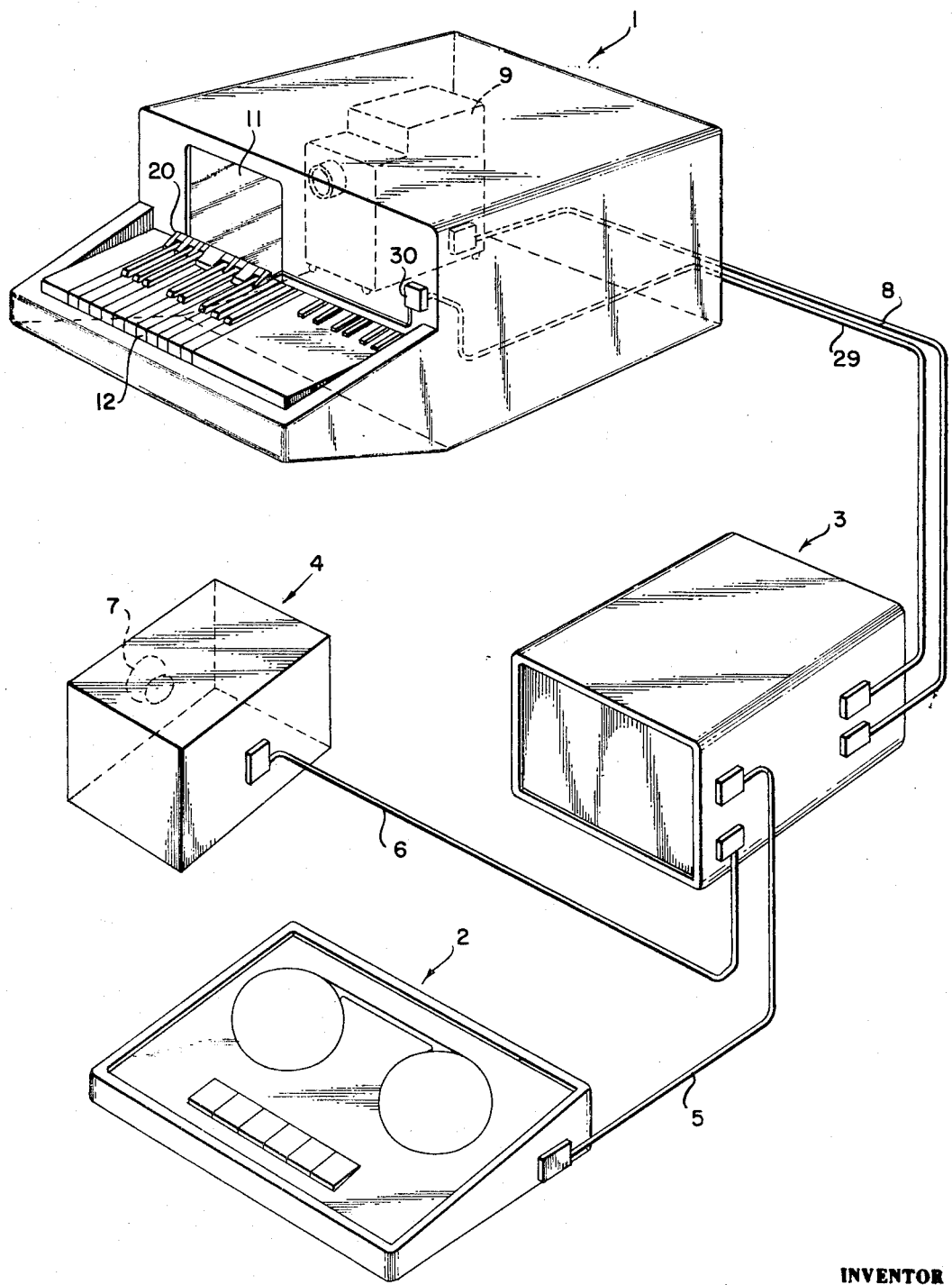
FIG. 1 is a perspective view of the apparatus of this invention.

Referring to FIG. 1, a preferred embodiment of the system of this invention comprises a student's console generally indicated at 1, a tape player 2, a decoder 3, and an audio reproducing means 4.

The tape player 2 is of any conventional design, and is depicted diagrammatically inasmuch as the structure thereof forms no part of this invention. In practice, the cassette type of tape player has been found preferable. It functions to read out at least a portion of a program of synchronized audio and visual instructional information pre-recorded on tape in a form which includes the basic audio instructional information and further includes, in any one of three different embodiments, either 1. cueing signals for operation of means, such as a film strip projector, for reproducing the visual information portion of the program slaved to synchronism with the audio,
2. cueing signals as in (1) and additional coded signals for operation of light displays in the manner of the aforementioned application Ser. No. 80,354 (now U.S. Pat. No. 3,664,036) and in U.S. Pat. No. 3,377,716, or 3. a complete program of audio and visual information recorded in the form used in cartridge television recording.

The invention will be further described as it is practiced in the second embodiment referred to above, it being understood that in the first embodiment the light bar and associated decoding equipment is merely eliminated from the system, and in the third embodiment, the visual reproduction is directly from the tape, wherein a television reproducing means including a cathode ray tube (not shown) replaces the projector and screen illustrated in the drawings.

In the second embodiment listed above, signals from the tape are read out at the tape deck and fed through cable 5 to the decoder 3, also of the type generally set forth in the aforementioned application and patent. This decoder serves to distinguish the audio portion from the visual cueing and informational portion of the program, and passes the audio signals through cable 6 to audio reproducing means 4 comprising a conventional audio amplifier (not shown) and loudspeaker 7.

Figure 2:
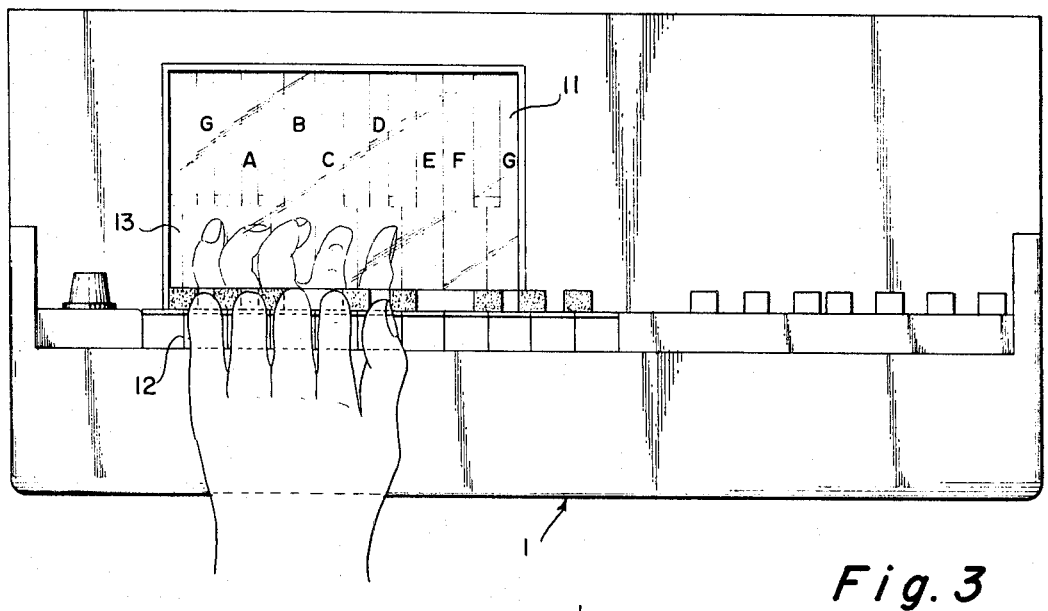
FIG. 2 is a front elevational view of a keyboard illustrating a student's hand approaching the keyboard in correspondence to the pictorial representation therebehind.
Figure 3:
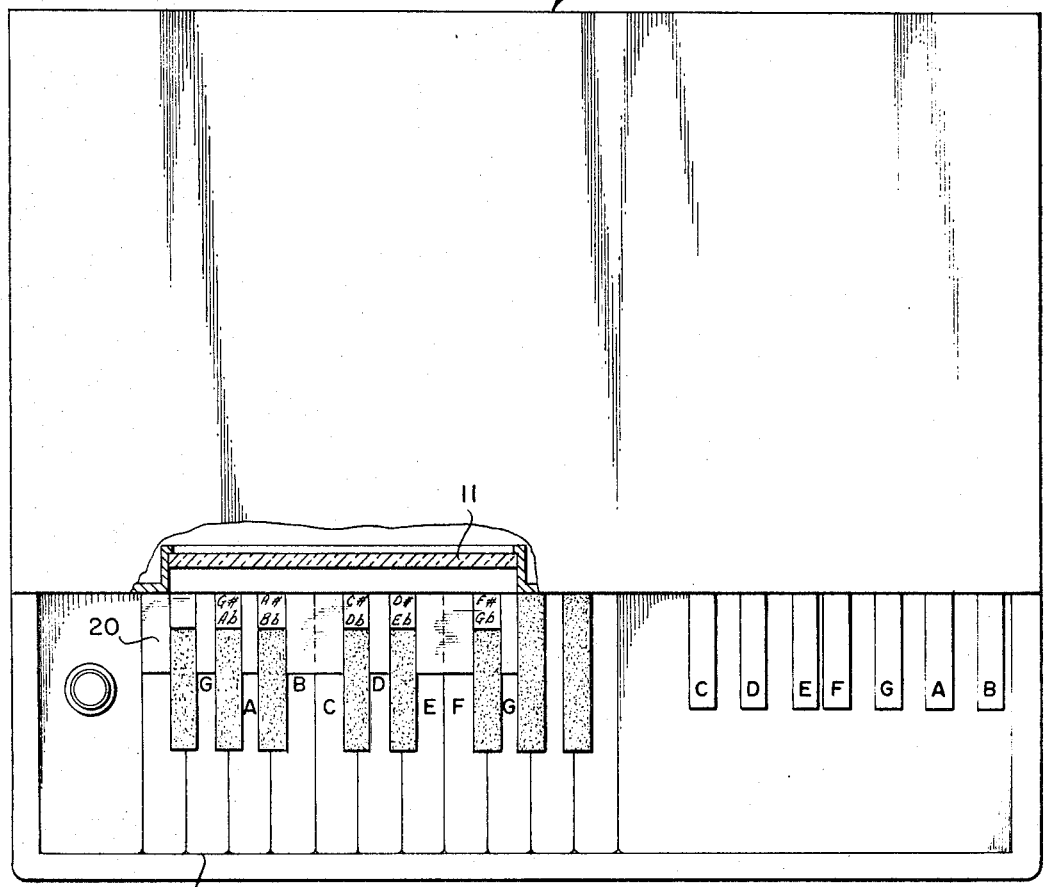
FIG. 3 is a plan view of the keyboard of this invention.

Within the decoder 3 cueing signals are detected and are passed through cable 8 to the film strip advance mechanism of a conventional projector 9. The projector is arranged to project pictorial representations of the visual instructional portion 10 of the program on a screen 11. The placement of the screen 11 is an essential feature of the invention, as its location at a point contiguous to the keyboard itself permits presentation of images of individual keys in a position of precise correspondence with the respective keys of the keyboard itself. Referring to FIG. 2, the screen is placed in juxtaposed relationship to the keyboard, i.e., directly above and to the rear of the keyboard itself, the lower edge of the screen being substantially contiguous to the keyboard itself. The pictorial representation projected on the screen is carefully dimensioned and framed so as to orient the image of any given key in direct correspondence with the position of the respective key of the keyboard. Note, for instance, that the key G, designated by reference numeral 12, is directly under the image representative of key G, the image being designated by reference numeral 13.

Figure 7:
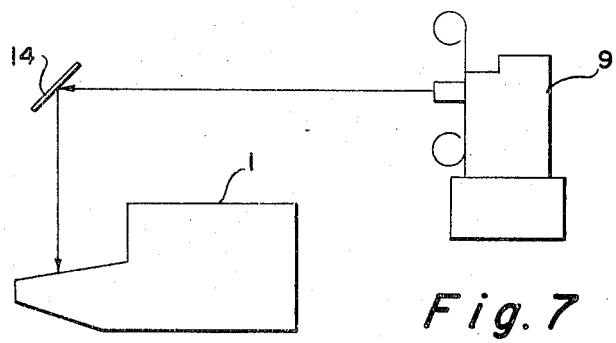
FIG. 7 is a diagrammatic representation of a second embodiment of the invention wherein the pictorial representation is presented directly on the key surfaces.

In an alternative embodiment illustrated in FIG. 7, the projector 9 is so oriented as to project the image directly upon the surface of the keys themselves, as through an optical path including a reflector 14. In this case, the surface of the keys takes the place of the separate screen 11 and functions as what is referred to in the ensuing claims as "means substantially contiguous to the keyboard for displaying pictorially represented keys," it being understood that the term "substantially contiguous" is considered generic to either a screen situated so closely proximate to the keyboard that one edge of one is virtually in contact with an edge of the other, or to a structure wherein the key surface itself functions as the screen and wherein the key images are actually congruent to the individual keys and thus where more than one edge is contiguous thereto. Similarly, the term "positional correspondence" is generic to a representation wherein the position of the sides of each key image is either in vertical alignment or is congruent to the sides of the corresponding key on the keyboard.

Figure 4:
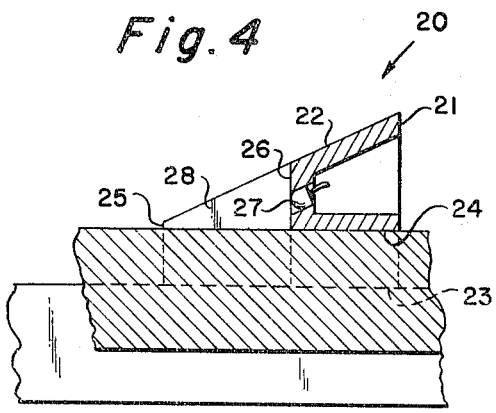
FIG. 4 is a cross section of the light bar taken on section IV—IV of FIG. 6.
Figure 5:
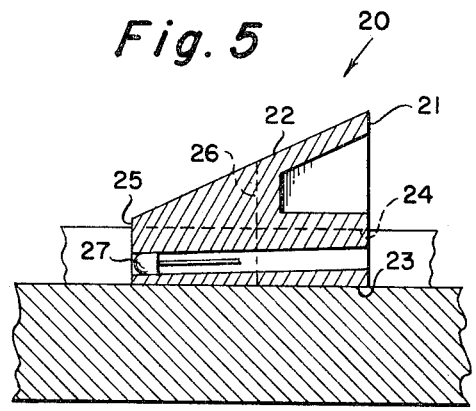
FIG. 5 is a cross section of the light bar taken on section V—V of FIG. 6.
Figure 6:
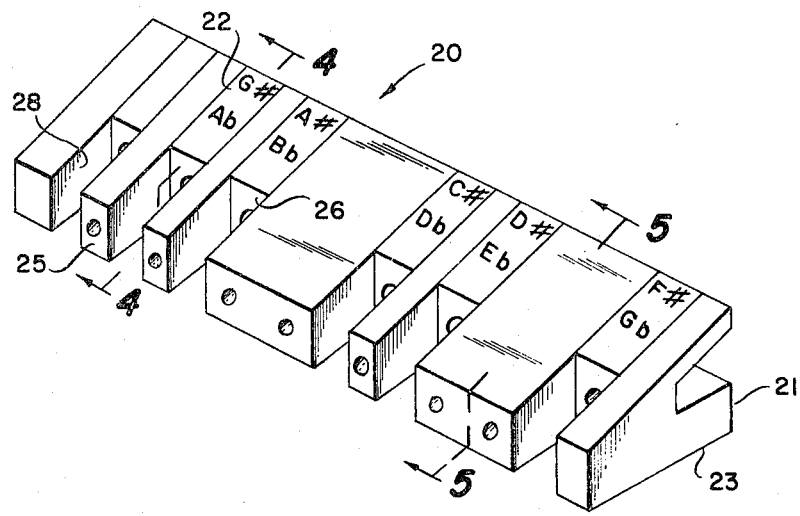
FIG. 6 is a perspective view of the light bar.

In the operation of this system, yet to be described, it often becomes desirable to reinforce the pictorial representation with light indicators designating the locations of keys directly on the keyboard itself. To this end, the system of this invention includes a light bar 20 positioned on the keyboard as illustrated in FIG. 1 and shown in more detail in FIGS. 4, 5 and 6. The light bar 20 comprises a block 21 comprising an upper surface 22 on which appears indicia appropriate to the identity of the keys over which the light bar is to be placed. The bottom surface of the block 21 is configured to key the light bar to proper placement on the keys. To this end, those portions of the bar overlying the white keys have a bottom surface 23 lying in a first plane while those portions overlying the black keys have a bottom portion 24 in a plane elevated from the first plane to accommodate the elevated touch surface of black keys on a normal keyboard. With this bottom configuration, the light bar will fit in only one position within the span of an octave on the keyboard and, once in place, will be retained in properly indexed position without need of any fasteners or other retaining means.

The light bar further includes front surfaces 25, 26, etc., overlying each individual key, the surfaces 26 overlying black keys being preferably set back from the surfaces 25 which overlie white keys. Each front surface which overlies a significant key, i.e., a key which figures in the instructional program, has disposed thereon a light 27 set back slightly from the surface 25 or 26 so as to be visible to the student only indirectly and so as to project a light beam on the surface of the corresponding individual key. By appropriate choice of the lamp, use of light piping (not shown) and dimensions of the setback from the front surface the projected light may be confined or at least concentrated within the bounds of the surface of one key. Note also that the setback of the front surfaces 26 overlying black keys provides side walls 28 which assist in this regard.

The wiring of the light bar 20 does not comprise a portion of the invention claimed herein, and hence is not shown, reference again being made to U.S. Pat. No. 3,377,716 for a disclosure thereof. Insofar as this invention is concerned, it will suffice to state that coded information read from the prerecorded tape by player 2 and recognized and decoded at 3 is fed to the light bar 20 through cable 29 to energize appropriate lights in synchronized relationship to the other portions of the program, namely the audible instructions heard from speaker 7 and the pictorial representations presented at the keyboard by projector 9. Inasmuch as the use of the light bar is optional, it is preferable to connect it to the system by a readily accessible multi-contact plug 30 so as to facilitate its removal when not in use.

DESCRIPTION OF OPERATION OF INVENTION

The unit is self-sufficient and requires no auxiliary equipment, although printed instructions or "work sheets" prepared in concert with the audio-visual program are helpful. In use, the student is situated before the console 1 within audible range of the speaker 7. Operation of the apparatus is initiated simply by selecting the proper lesson on tape, and the corresponding film strip, loading them into the tape player and projector, and depressing the playback control on the tape player.

The pre-recorded program comprises an audio portion recorded on the tape in conventional fashion, and a visual informational portion disposed in part on the tape and in part on the film strip. The portion disposed upon the film strip comprises the pictorial representation of instructional information while that disposed on the tape comprises cues for advancing the film strip and coded signals for control of the light bar.

Considering a logical make-up of an elementary lesson, the tape would initially include an audible description of the keyboard itself, at which time a pictorial representation of the bare keyboard is presented in the manner aforedescribed, i.e., with individual key images in direct positional correspondence to the position of individual keys of the keyboard itself. As the audible instruction proceeds to a point where certain keys are identified, a cue on the tape actuates the film advancing means of the film strip projector in will-known fashion to bring before the projector a similar pictorial representation having instructional stimuli in the form of identifying indicia superposed on the one or more key images being referred to in the narrative. Thus, the student's comprehension of the position of the keys is enhanced. While this pictorial representation remains in place, the narrative may refer to specific ones of the keys identified therein. At each point in the narrative where this occurs, a coding signal or signals distinctive of that key or keys is present on the tape. Each coding signal or signals would, of course, have appropriate switching signals associated therewith when the apparatus and method of the aforementioned application Ser. No. 80,354 is practiced. This signal, acting through decoder 3, is effective to activate the light 27 on light bar 20 which overlies the said one key or keys being referred to, thus reinforcing the visible instructional stimulus provided by the pictorial representation.

As the instruction proceeds, there comes a time when the student receives instructions to place his fingers over specific keys. Here, the form of the student's hand becomes important. Hence, a cue causes further advancement of the film strip to a frame which includes an image of an operator's hand superposed on the keyboard image, as illustrated in FIG. 2. The student may then compare the manner in which he is placing his hand on the keyboard with the pictorial representation appearing either just adjacent thereto (FIG. 2) or congruent thereto (FIG. 7), and correct the form or position of his hand to bring it into exact compliance with the pictorial representation. Again, the visual stimulus may be further enhanced by the appropriate activation of the light bar.

In the foregoing description, reference has been made to the use of film strip in which advancement occurs intermittently in response to individual cues on the tape, It should, however, be understood that equivalent methods of presentation such as a motion picture projector slaved to synchronism with the audio or carrying the audio and video on the same media, or cartridge television carrying the audio and video on the same media are considered full equivalent means. The specific means described throughout the ensuing specification are set forth as merely exemplary and not as limits on the scope of my invention, the scope of which is to be determined by a consideration of the following claims:

I claim:

1. A system for instruction in the operation of a keyboard controlled instrument, said system comprising:
   a. at least one keyboard including keys,
   b. means including a pre-recorded program of synchronized audio and visual instructional information,
   c. means for audibly reproducing the audio instructional content of said program,
   d. means for deriving from at least a portion of the visual informational content of said program a changeable sequence of pictorial representations of instructional stimuli superposed on key images in a position indicative of the response being solicited of a student, said key images comprising a reproduced likeness of key surfaces,
   e. means substantially contiguous to said keyboard for displaying said pictorial representations, and
   f. means projecting said representations on said display means with said key images in direct positional correspondence with the keys of said keyboard.

2. A system for instruction in the operation of a keyboard controlled instrument as set forth in claim 1, wherein said display means is disposed in juxtaposition to said keyboard and said direct positional correspondence comprises a vertical alignment between said pictorially represented key images and said keys.

3. A system for instruction in the operation of a keyboard controlled instrument as set forth in claim 1 wherein said means for displaying comprises the touch surface of the keys and said direct positional correspondence is a congruence between said pictorially key images and said keys.

4. A system for instruction in the operation of a keyboard controlled instrument as set forth in claim 1 wherein said prerecorded program comprises a magnetic tape including said audio information and control signal components of said visual information, and further comprises a film strip including pictorial components of said visual instructional information.

5. A system for instruction in the operation of a keyboard controlled instrument as set forth in claim 1 wherein said instructional stimuli include an image of an operator's hand in direct positional correspondence to the hand position being solicited as said response of said student.

6. A system for instruction in the operation of a keyboard controlled instrument as set forth in claim 5 wherein said instrument is an organ.

7. A system for instruction in the operation of a keyboard controlled instrument as set forth in claim 1 and additionally including a plurality of light indicators, each said indicator overlying an individual key of said keyboard, the instructional information content of said program including control signals in addition to said pictorial information, and means responsive to said control signals for actuating said light indicators.

8. A method of providing instruction in the operation of a keyboard controlled instrument, said method comprising the steps of
   A. providing a pre-recorded program of audio and visual instructional information,
   B. audibly reproducing the audio content of said program, C. deriving from at least a portion of the visual content of said program a pictorial representation of instructional stimuli superposed on images comprising a reproduced likeness of a keyboard, D. projecting said pictorial representation and displaying same in a position substantially contiguous to the keyboard with said key images in direct positional correspondence with the keys of the keyboard, and E. advancing said program while maintaining said audio and visual content in synchronism.

9. The method of providing instruction in the operation of a keyboard controlled instrument as set forth in claim 8 wherein step C comprises deriving said instructional stimuli in the form of an operator's hand superposed on said key images in direct position correspondence to the hand position being solicited as a response of a student.

10. The method of providing instruction in the operation of a keyboard controlled instrument as set forth in claim 8 wherein step D comprises projecting said pictorial representation on the touch surface of said keyboard so that said direct positional correspondence manifests itself as a congruent relationship between individual key images and the corresponding keys of the keyboard.

11. The method of providing instruction in the operation of a keyboard controlled instrument as set forth in claim 8 wherein step D comprises presenting said pictorial representation in juxtaposition to said keyboard so that said direct positional correspondence manifests itself as a vertical alignment between said key images and said keys.

12. The method of providing instruction in the operation of a keyboard controlled instrument as set forth in claim 8 wherein said program comprises instructional information for playing an organ.

* * * * *